US012694767B2

(12) United States Patent
Jernigan et al.

(10) Patent No.: US 12,694,767 B2
(45) Date of Patent: Jul. 28, 2026

(54) WEARABLES SECURITY DEVICE

(71) Applicant: InVue Security Products Inc., Charlotte, NC (US)

(72) Inventors: Elliott Jernigan, Indian Trail, NC (US); Justin A. Richardson, Waxhaw, NC (US); Joshua Abdollahzadeh, Denver, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 18/762,049

(22) Filed: Jul. 2, 2024

(65) Prior Publication Data

US 2025/0014436 A1 Jan. 9, 2025

Related U.S. Application Data

(60) Provisional application No. 63/525,391, filed on Jul. 7, 2023.

(51) Int. Cl.
*G08B 13/14* (2006.01)

(52) U.S. Cl.
CPC ....... *G08B 13/1463* (2013.01); *G08B 13/149* (2013.01)

(58) Field of Classification Search
None
See application file for complete search history.

(56) References Cited

U.S. PATENT DOCUMENTS 11,804,115 B1 10/2023 Kelsch et al.
2012/0182146 A1* 7/2012 Berglund ........... G08B 13/1445 340/568.2

(Continued)

FOREIGN PATENT DOCUMENTS

WO WO-2016085962 A1 * 6/2016 ......... G08B 13/1463

OTHER PUBLICATIONS

W2000 Custom Charge Head & Tray Sensor for Garmin Instinct ZW/1960, ZQ1910, & ZW1967 (Year: 2020).*

(Continued)

*Primary Examiner* — Muhammad Adnan
(74) *Attorney, Agent, or Firm* — InVue Security Products Inc.

(57) ABSTRACT

A merchandise display security device for displaying and protecting a wearable device from theft is provided. In one example, the wearable device includes a body and a band secured thereto. The merchandise security device includes a sensor configured to be coupled to the wearable device, wherein the sensor comprises a tray sensor configured to electrically connect to the body. The merchandise security device also includes a display stand configured to removably support the sensor thereon and a cable electrically connected to the sensor. The merchandise security device further includes an alarm module electrically connected to the cable and the sensor, and the tray sensor comprises a plurality of contacts located at each of a plurality of different locations to facilitate an electrical connection with the body. In addition, a sense loop is configured to be defined through the cable and the tray sensor, and the alarm module is configured to generate a security signal in response to interruption of the sense loop.

17 Claims, 6 Drawing Sheets

(56) References Cited

U.S. PATENT DOCUMENTS

| | | | | |
|---|---|---|---|---|
| 2014/0060218 | A1* | 3/2014 | Bisesti | F16M 11/04 248/274.1 |
| 2015/0091729 | A1* | 4/2015 | Phillips | G08B 13/1409 340/568.2 |
| 2016/0055728 | A1* | 2/2016 | Grant | G08B 13/1409 340/568.4 |
| 2016/0210828 | A1* | 7/2016 | Grant | F16B 47/003 |
| 2018/0047263 | A1* | 2/2018 | Burtness | G08B 13/1436 |
| 2018/0342136 | A1* | 11/2018 | Hartweg | G08B 13/1463 |
| 2019/0295389 | A1* | 9/2019 | Hartweg | G08B 13/1463 |
| 2020/0234550 | A1* | 7/2020 | Berglund | G08B 13/1445 |

OTHER PUBLICATIONS

"W2000 Custom Charge Head & Tray Sensor for Garmin Instinct ZW1960, ZQ1910, & ZW1967," <https://invue.com/products/w2000>, dated Jun. 18, 2020 (3 pages).

"Technical Disclosure Commons," <https://www.tdcommons.org/invue>, dated May 26, 2016 (28 pages).

* cited by examiner

WEARABLES SECURITY DEVICE

CROSS REFERENCE TO RELATED APPLICATIONS

This application claims the benefit of priority to U.S. Provisional Application No. 63/525,391 filed on Jul. 7, 2023, the entire contents of which are hereby incorporated by reference herein.

FIELD OF THE INVENTION

Embodiments of the present invention relate generally to merchandise display security devices for displaying and protecting an article of merchandise from theft, such as a wearable device.

BACKGROUND OF THE INVENTION

Retailers routinely display articles of merchandise, such as cellular phones, portable computers (e.g. laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. Accordingly, these articles of merchandise need to be secured by a security device that effectively protects the merchandise from theft.

"Smart" devices are beginning to propagate into the traditional watch and wearable computer ("wearables") space. It would be desirable for some retailers to protect such smart watches and wearables from theft, while providing suitable customer interaction with the watch.

BRIEF SUMMARY

Embodiments of the present invention are directed towards merchandise display security devices, systems, and methods for displaying and protecting a wearable device from theft. The wearable device typically comprises a body and a band secured thereto. In one example embodiment, the security device includes a sensor configured to be coupled to the wearable device, wherein the sensor comprises a tray sensor configured to electrically connect to the body. The security device further includes a display stand configured to removably support the sensor thereon, a cable electrically connected to the sensor, and an alarm module electrically connected to the cable and the sensor. The tray sensor comprises a plurality of contacts located at each of a plurality of different locations to facilitate an electrical connection with the body, and a sense loop is configured to be defined through the cable and the tray sensor. The alarm module is configured to generate a security signal in response to interruption of the sense loop.

In another embodiment, a merchandise security device includes a sensor configured to be coupled to the wearable device, wherein the sensor comprises a tray sensor configured to electrically connect to the body. The security device further includes a display stand configured to removably support the sensor thereon, a cable electrically connected to the sensor, and an alarm module electrically connected to the cable and the sensor. In addition, the security device includes an adapter configured to removably engage the body of the wearable device, wherein the tray sensor comprises a plurality of contacts configured to electrically connect to the adapter when the body is attached to the tray sensor. A sense loop is configured to be defined through the cable and the tray sensor, and the alarm module is configured to generate a security signal in response to interruption of the sense loop.

DETAILED DESCRIPTION OF EMBODIMENTS OF THE INVENTION

Figure 1:
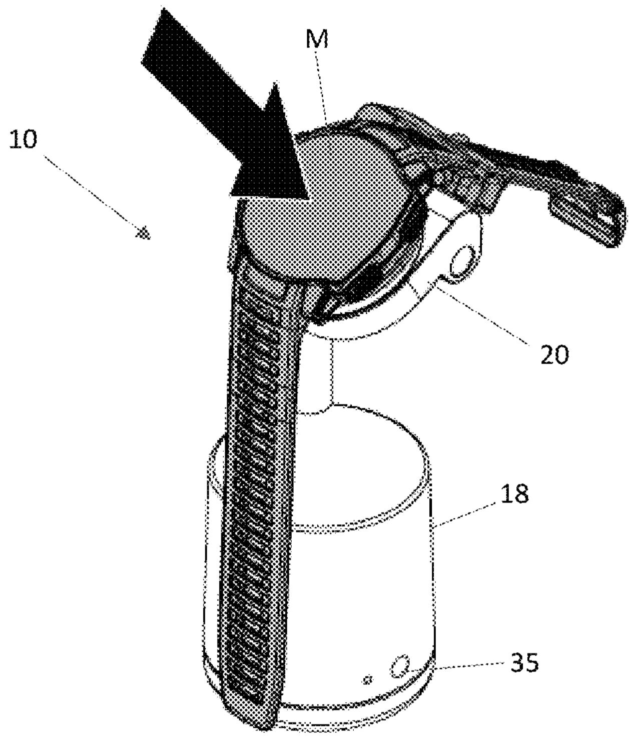
FIG. 1 is a perspective view of a merchandise display security device according to one embodiment.

Embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Referring now to the accompanying drawing figures wherein like reference numerals denote like elements throughout the various views, one or more embodiments of a merchandise display security device for displaying and protecting an article of merchandise from theft are shown. More particularly, the drawing figures show embodiments of a merchandise display security device, indicated generally by reference character 10, for being attached to an article of merchandise, indicated generally by reference character M. In one embodiment, the article of merchandise is a wrist watch or wearable computer having a band and a body (collectively "wearable devices"). The body may include any number of components, such as an internal battery, processor, wireless communication circuitry, etc. The article of merchandise may be a smartwatch in some embodiments. A smartwatch may be like a wrist watch in some respects but include additional functionality, such as similar functionality provided by a computer, mobile phone, or personal digital assistant. In other embodiments, the article of merchandise is any device configured to be secured about a wearer's wrist or otherwise worn by a consumer (e.g., about a consumer's wrist, ankle, neck, etc.). For example, the article of merchandise may be any "wearable" device.

In one embodiment, the security device 10 includes a sensor 12 configured to be coupled to the article of merchandise M. In the illustrated embodiment, the security device 10 comprises a sensor 12 and a cable 16 coupled thereto. The sensor 12 may be configured to be secured to the article of merchandise for protecting the article from theft or unauthorized removal, as explained in further detail below. The sensor 12 may be adaptable for use with a variety of wearable devices such that the illustrated embodiments are not intended to be limiting.

Cable 16 may be configured to electrically connect the sensor 14 to an alarm module 30 and to activate a security signal (e.g., an audible and/or a visible alarm) in the event of a security event, such as if the cable is cut, severed, or removed from the article of merchandise M and/or sensor 12, or should the article of merchandise be removed from the sensor. As such, cable 16 may comprise one or more conductors disposed within a protective outer sheath.

At least one of the conductors may conduct a security signal between the sensor 12 and the alarm module 30, which is configured to activate an alarm in the event that the electrical signal or sense loop is interrupted indicating a possible theft condition. The alarm module 30 may be configured to be armed or disarmed with a key 40, such as an electronic key configured to wirelessly transmit a security code. For example, FIG. 1 shows that the alarm module 30 may include a port 35 for communicating with a key 40. A connector 42 may be disposed at one end of the cable 16 for connecting the cable to the sensor 12, while the opposite end of the cable may be connected to a display stand which may be in turn connected to an external source of electrical power, for example a conventional power outlet.

As will be understood and appreciated, cable 16 alternatively may be a mechanical security cable, for example a high strength, cut resistant cable, with or without a security signal conductor in the event that the displayed article of merchandise does not require electrical power or obtains electrical power from another power cable. Likewise, the cable 16 may alternatively be a power cable that provides electrical power to the electronic article of merchandise without a security signal conductor in the event that the mechanical security provided by the electro-mechanical power cable is sufficient for protecting the article of merchandise from theft.

Figure 12:
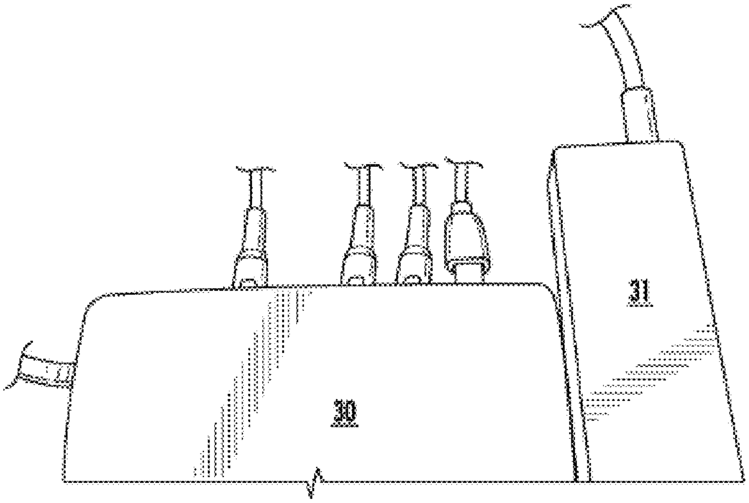
FIG. 12 is a perspective view of an alarm module and a power source according to one embodiment.

In the embodiment of the security device 10 illustrated in FIG. 12, the alarm module 30 is shown positioned in a secure location, for example underneath a display counter or within a locked cabinet, so that the alarm module is not readily accessible to unauthorized persons. The alarm module 30 may contain alarm electronics for monitoring the state of the security signal conducted by the cable 16 and for activating an internal or remote audible and/or visible alarm in the event of a possible theft condition. The alarm module 30 may optionally contain voltage regulating and/or power management electronics for modulating the voltage (e.g. 18V) of the external source of electrical power to provide an appropriate operating voltage (e.g. 5V) to the article of merchandise.

Figure 2:
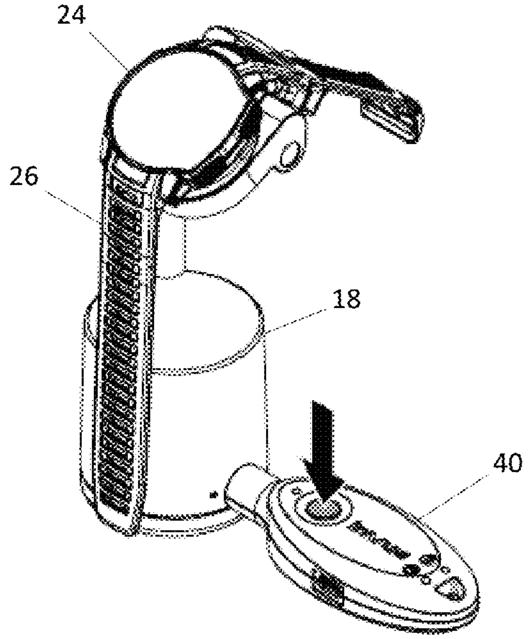
FIG. 2 is another perspective view of the merchandise display security device shown in FIG. 1 in communication with a key according to one embodiment.
Figure 3:
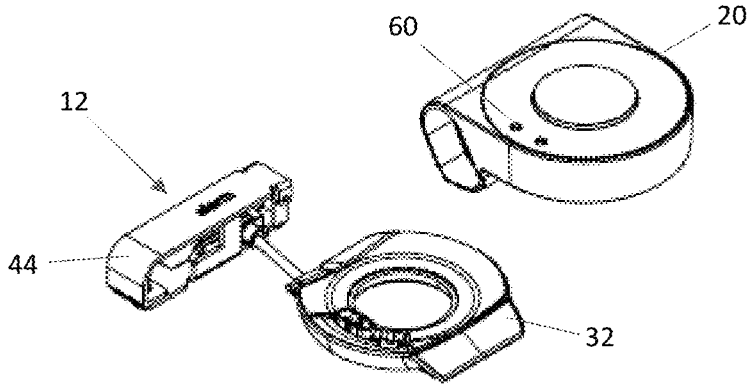
FIG. 3 is a perspective view of a sensor and a charge head according to one embodiment.

As shown FIGS. 1-2, the security device 10 may include a display stand 18 for supporting the article of merchandise. The display stand 18 may be in the form of a pedestal for supporting the article of merchandise in a displayed position. The display stand 18 may be configured to be secured to a display surface, such as a counter, fixture, table, shelf, or the like, such as with a pressure-sensitive adhesive. The display stand 18 may include a charge head 20 configured to support the article of merchandise thereon, as explained in further detail below. The article of merchandise and sensor 12 may be readily removed from the display stand 18 for inspection. The cable 16 may extend between and be connected to both the sensor 12 and the display stand 18. The cable 16 could be releasably connected to the display stand 18 with a connector or could be hardwired thereto. A portion of the cable 16 may be elastically extendable and retractable such that the article of merchandise attached thereto may be extended away from the display stand 18 for inspection. The cable 16 may be a coiled cord that is elastic and extendable relative to a display stand. Alternatively, the cable 16 may be coupled to a recoiler that is configured to retractably store the cable therein. The recoiler could be housed within the display stand 18 in some embodiments, such as a base of the display stand, or could be positioned below a display surface or counter. In addition, the display stand 18 and/or charge head 20 could include an alignment mechanism for cooperating with the sensor 12 coupled to the article of merchandise for securing the article in a desired position. For example, the charge head 20 could include one or more magnets or magnetically attractable material configured to cooperate with corresponding magnets or magnetically attractable material on the sensor 12 and/or the article of merchandise.

The display stand 18 may also include electronics (e.g., circuitry or a printed circuit board) for electrically connecting the alarm module 30 and the sensor 12. The electronics in the display stand 18 could also be employed to pass power to the article of merchandise when supported thereon. The alarm module 30 may be configured to generate a security signal should the cable 16 be removed from the display stand 18. It is understood that the display stand 18 may be electrically connected to a remote alarm module 30, or the alarm module may be integrated with the display stand 18. Thus, the alarming electronics may be integrated within the display stand 18 if desired for providing a standalone security solution. It is further understood that the size and configuration of the display stand 18 may be modified to accommodate any desired wearable device, as well as sensors 12 having different sizes and configurations. In the instance where power is desired to be provided to the wearable device, the display stand 18 may be electrically connected to a power source 31 via a power cable. Thus, the security device may permit a potential purchaser to examine and operate the wearable device in a powered state while secured.

Figure 7:
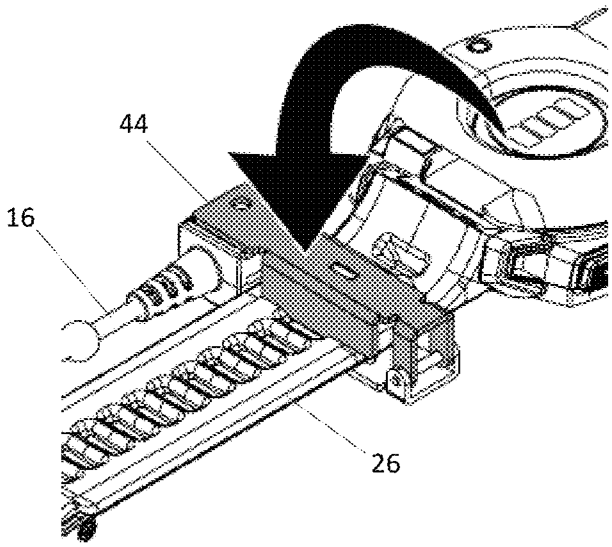
FIG. 7 is a perspective view of a sensor attached to a wearable device according to one embodiment.

In one embodiment, the cable 16 terminates with a sensor 12 that is configured to attach to the article of merchandise M, such as a wrist watch or other wearable device. In the illustrated embodiments, the wearable device may include a body 24 configured to be secured to a band 26, wherein the band is configured to be secured to a wearer's wrist. The sensor 12 may be configured to clamp or otherwise couple to the band in some embodiments via a band clamp 44. The sensor 12 may also be secured to the band using other additional or alternative techniques, such as with an adhesive 25 and/or one or more fasteners 27. In this regard, the band clamp 44 may include a first member and a second member that are configured to engage with one another and about the band (see, e.g., FIG. 7). The first and second members may be secured together with one or more fasteners. The first and second members cooperate with one another to define an opening for receiving a portion of the band therethrough. It is understood that the sensor 12 may be configured to various sizes and configurations for accommodating different bands. For example, the sensor 12 may be a clamp that is configured to extend at least partially around the band and may include one or more components that are configured to attach to the band and/or one another. In one instance, the sensor 12 is a clamp that is bendable and configured to be bent around the band. In other cases, the band may include components that couple to one another (e.g., snap or friction fit) and the band. The sensor 12 may be secured using various means such as fasteners and/or adhesive. In some cases, the cable 16 is configured to electrically connect to the band clamp 44.

Moreover, the sensor 12 may include a sensing device configured to detect removal of the band in an unauthorized manner. For example, the sensing device may be a pressure or plunger switch that is configured to engage the band or otherwise detect removal of the band clamp 44 when the sensor is secured thereto. The sensing device may be in communication with sensor electronics in the sensor 12 that is configured to detect actuation of the sensing device to thereby provide a signal to the alarm module 30 via the cable 16 for generating an alarm. Thus, the sensor electronics may be in electrical communication with the alarm module 30 and associated alarm electronics via the cable 16. In some embodiments, the sensor electronics includes circuitry, a printed circuit board, or the like that is electrically connected to the sensing device and the cable. Engagement of the sensing device with the band or band clamp 44 may cause the sense loop to be completed and the alarm module 30 to be armed. Alternatively, a key 40 may be used to arm the sensing device.

In one embodiment, the sensor 12 also includes a tray sensor 32. The tray sensor 32 may be attached to any desired location on the body 24, such as the rear surface of the body as illustrated. When attached to the body 24, the tray sensor has a low profile that does not interfere with a customer's ability to try on the wearable device, and may also be positioned so as to no interfere with any electrical contacts or sensors on the body. The tray sensor 32 may be configured to electrically connect to the band clamp 44 and/or the body 24. In this case, the tray sensor 32 may facilitate power transfer to the wearable device and in some embodiments, the tray sensor completes a sense loop such that removal of the tray sensor results in interruption of the sense loop. The tray sensor 32 may be hardwired to the band clamp 44 via a cable 48 or could be releasably engaged in alternative embodiments. The cable 48 may include one or more conductors for completing a sense loop, such as in cooperation with the sense loop defined in cable 16.

Figure 4:
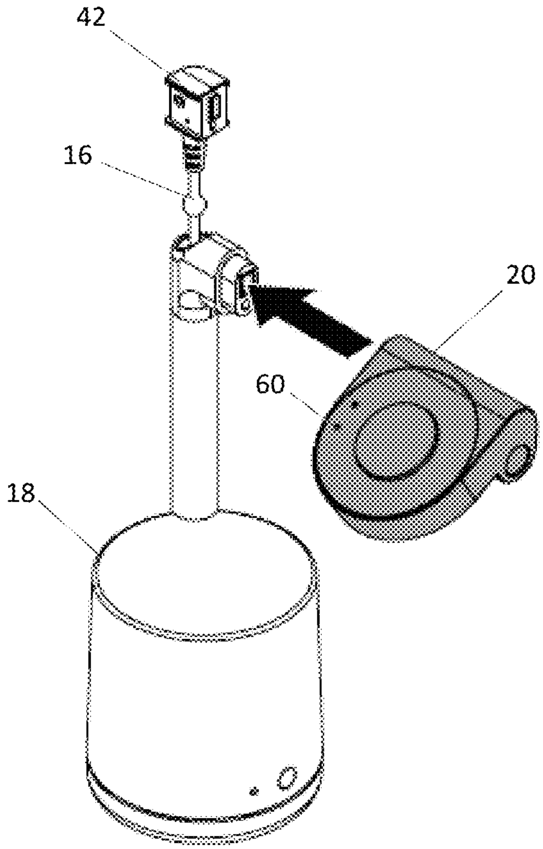
FIG. 4 is a perspective view of a display stand and a charge head according to one embodiment.
Figure 5:
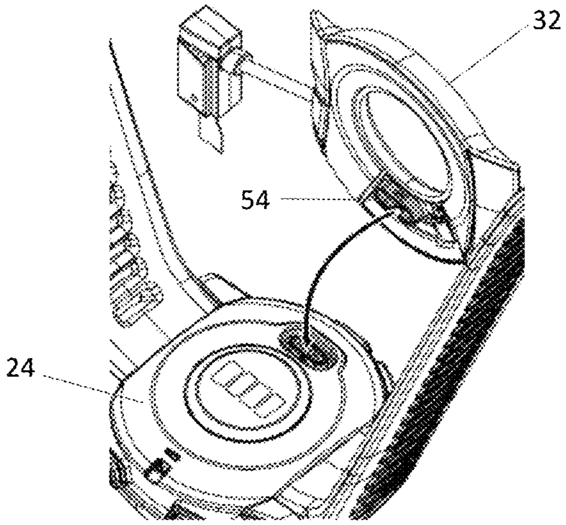
FIG. 5 is a perspective view of a tray sensor prior to attachment to a wearable device according to one embodiment.
Figure 6:
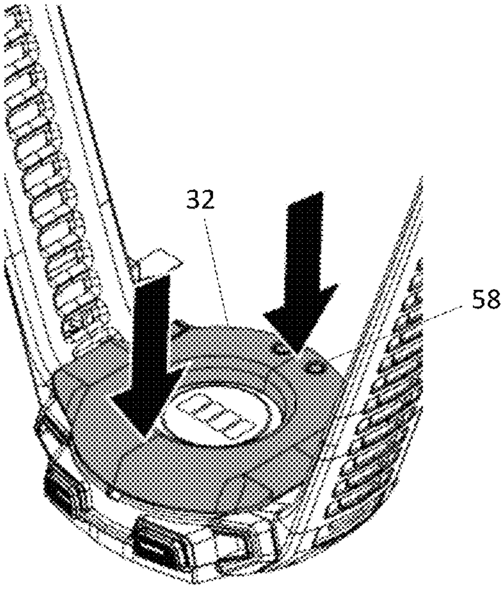
FIG. 6 is a perspective view of the tray sensor shown in FIG. 5 attached to the wearable device.

Moreover, the tray sensor 32 may be configured to be removably supported on the charge head 20 for facilitating power transfer from the charge head to the tray sensor and in turn to the body 24. In this regard, the tray sensor 32 may include one or more electrical contacts 58 that are configured to align with and electrically connect to one or more electrical contacts 60 on the charge head 20 when the tray sensor is supported on the charge head. In some cases, the charge head 20 is removably connected to the display stand 18 (see, e.g., FIG. 4), although the charge head could be fixedly attached to the display stand in other embodiments. For example, in one embodiment, different charge heads 20 may be interchangeable and configured to electrically connect to the display stand to account for different types of wearable devices.

Figure 8:
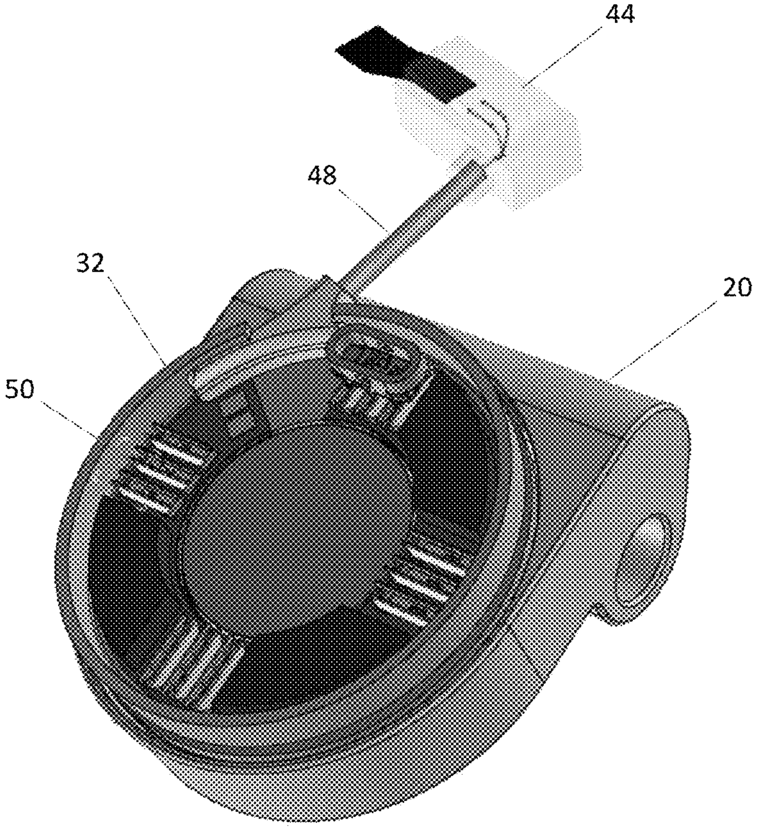
FIG. 8 is a perspective view of a tray sensor supported on a charge head according to one embodiment.
Figure 9:
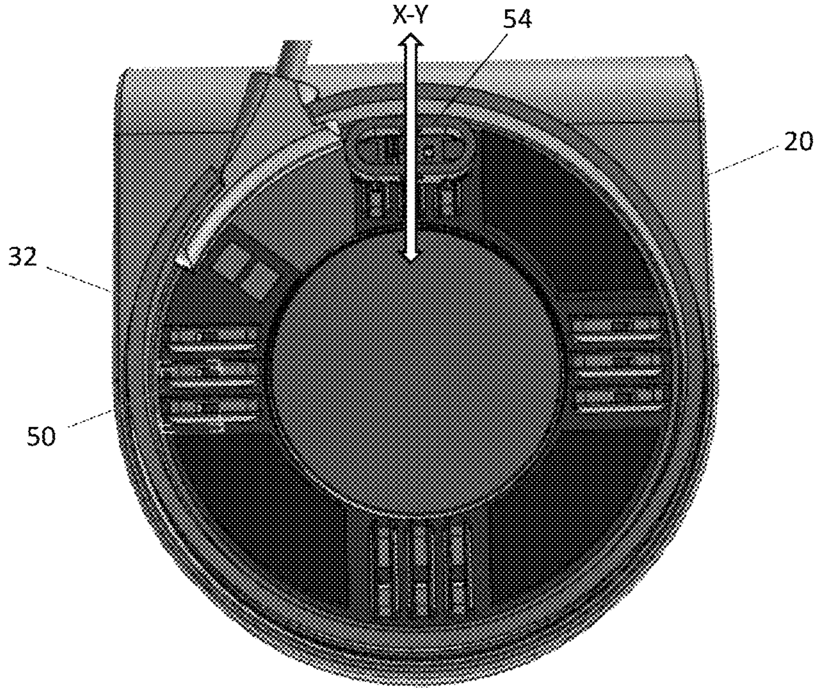
FIG. 9 is a plan view of the tray sensor supported on the charge head shown in FIG. 8.

The tray sensor 32 may include one or more electrical contacts 50 configured to electrically connect to corresponding contacts on the body 44. As shown in FIGS. 8-9, the contacts 50 may be located at the 12, 3, 6, and 9 o'clock positions, although the contacts may be located at any desired location. The location of the contacts 50 may be driven by the location of the contacts on any given body 24, as different wearables may have different contact locations and configurations. In the illustrated example, each location may include a plurality of contacts 50 (see, e.g., FIG. 10 where three contacts are shown at one location). The contacts 50 may have different functions such as for ground, power, and/or completing a sense loop. Moreover, each of the contacts 50 may be electrically connected to a printed circuit board 52 housed within the tray sensor 32. The printed circuit board 52 may in turn be in communication with the cable 48 for transmitting power and/or sense signals. In some embodiments, the one or more contacts 50 may be configured to complete a sense loop with the band clamp 44. Thus, should the tray sensor 32 be disconnected or removed via disconnection of the contacts 50, the alarm module 30 may be configured to detect an interruption in the sense loop and to generate a security signal. The contacts 50 are also configured to facilitate power transfer to the body 24 for powering the wearable device.

Figure 10:
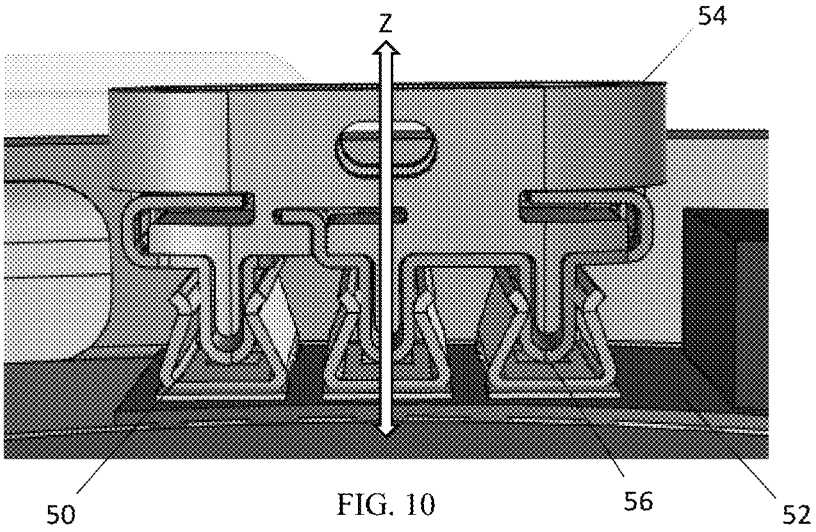
FIG. 10 is a cross-sectional view of an adapter in engagement with a tray sensor according to one embodiment.
Figure 11:
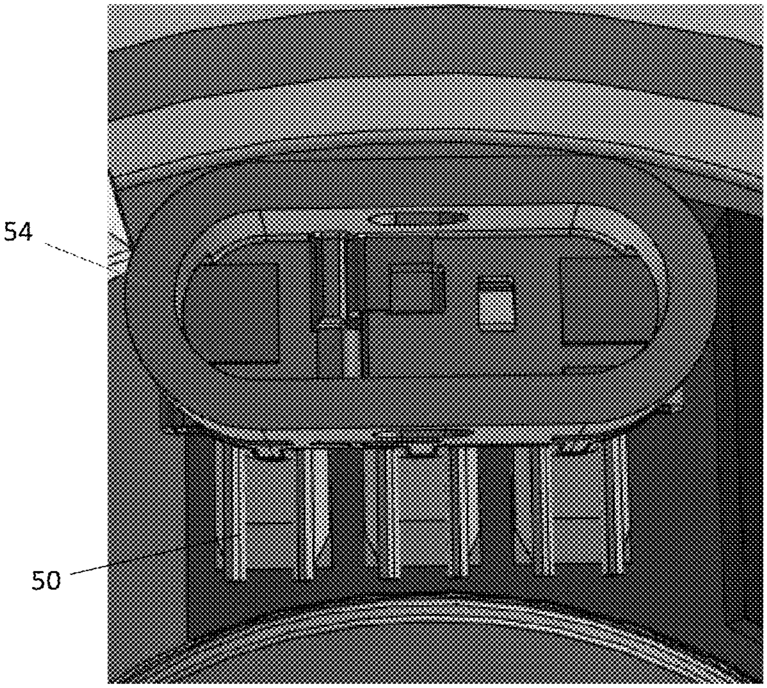
FIG. 11 is a plan view of the adapter in engagement with the tray sensor shown in FIG. 10.

The sensor 12 may further include an adapter 54 configured to facilitate an electrical connection between the tray sensor 32 and the body 24. In some embodiments, the adapter 54 is removably attached to the body 24 and configured to engage the tray sensor 32 at one or more locations depending on the location of the corresponding contacts on the body 24. As such, a more "universal" tray sensor 32 may be employed for a variety of different body 24 types. In some cases, the adapter 54 is configured to be secured to the body 24 in a snap fit or friction fit. Thus, the adapter 54 may be shaped to correspond to a recess or opening defined in the body 24 where the contacts on the body reside. The adapter 54 may include one or more electrical contacts 56 that are configured to align with and electrically connect to the contacts 50 on the PCB to facilitate power transfer while the body 24 is attached to the tray sensor 32. Advantageously, the contacts 50 may allow for variability in the position of the adapter 54 for facilitating an electrical connection with the body 24. In one example, the adapter 54 is configured to engage the contacts 50 in different locations along an X or Y direction as shown in FIG. 9. For instance, the length of the contacts 50 may be greater than the width of the adapter 54. As such, depending on variations in different body 24 configurations, the adapter 54 and contacts 50 are able to account for differences in body configurations and contact locations. This variability may be provided at any of the contact 50 locations on the tray sensor 32. In other embodiments, the adapter 54 may further be configured to be engage the contacts 50 at different locations in a Z-direction as shown in FIG. 10 to thereby account for any differences in Z-height required to facilitate an electrical connection with the body 24. For example, the height or depth of the contacts 50 may be greater than the height of the contacts 56. In some non-limiting examples, the cooperation between the contacts 50 and the adapter 54 is configured to account for variations of about 1-5 mm in an X, Y, or Z direction.

It is understood that the sensor 12 may not include any sensing electronics in some embodiments and may function as a clamp for securing the cable 16 to the band, i.e., the clamp mechanically secures the cable to the band. In some cases, the cable 16 may not terminate in the sensor 12 but may pass through the sensor acting as a clamp and be electrically coupled to the tray sensor 32. Clamping the cable 16 results in removing stress applied to the tray sensor 32 as the cable is extended. In one embodiment, the cable 16 may be a round cable, and the round cable may transition to the tray sensor 32. In other cases, the cable 16 and/or cable 48 may only be configured to transmit a sense signal for completing a sense loop and does not transmit any power signals, while in some embodiments, the cable 16 and/or cable 48 may be configured to transmit both sense and power signals.

Notably, the band clamp 44 is located on the band of the wearable device, while the tray sensor 32 is of a low profile. As a result, the customer is able to model the wearable device on his or her wrist without interference of the sensor 12. For example, the sensor 12 and tray sensor 32 may be sized and configured so as not hinder a customer's ability to wear the watch. The security device also does not require clamps or other features that surround the body of the wearable device and take away from the display of the wearable device. Furthermore, the tray sensor 32 may be of a low profile to allow for various types of power charging, including inductive charging. In addition, the configuration of the adapter 54 and contacts 50 allow for flexibility in ensuring an electrical connection is made with the body 24.

The foregoing has described one or more embodiments of a merchandise display for displaying and protecting an article of merchandise such as a wrist watch or wearable. Those of ordinary skill in the art will understand and appreciate that numerous variations and modifications of the invention may be made without departing from the spirit and scope of the invention. Accordingly, all such variations and modifications are intended to be encompassed by the appended claims.

That which is claimed is:

1. A merchandise display security device for displaying and protecting a wearable device from theft, the wearable device comprising a body and a band secured thereto, the security device comprising:

a sensor configured to be coupled to the wearable device, wherein the sensor comprises a tray sensor configured to electrically connect to the body;

a display stand configured to removably support the sensor thereon; a cable electrically connected to the sensor; and an alarm module electrically connected to the cable and the sensor, wherein the tray sensor comprises a set of plurality of contacts located at each of a plurality of different locations to facilitate an electrical connection with the body, wherein the sensor further comprises an adapter configured to electrically connect to each set of the plurality of contacts at any one of the plurality of different locations for electrically connecting the tray sensor to the body, wherein the adapter is configured to electrically connect to each set of the plurality of contacts at each of the plurality of locations at different X, Y, and Z locations, wherein a sense loop is configured to be defined through the cable and the tray sensor, and wherein the alarm module is configured to generate a security signal in response to interruption of the sense loop.

2. The security device of claim 1, wherein the sensor comprises a band clamp configured to engage the band.

3. The security device of claim 1, wherein the alarm module is integrated with the display stand.

4. The security device of claim 1, wherein the adapter comprises a plurality of contacts configured to electrically connect to each set of the plurality of contacts at each of plurality of different locations.

5. The security device of claim 1, wherein the adapter is configured to removably engage the body.

6. The security device of claim 1, wherein the adapter is configured to electrically connect to the body.

7. The security device of claim 1, wherein the adapter is configured to be received in a recess defined in the body.

8. The security device of claim 1, wherein the plurality of different locations are the 12, 3, 6, and 9 o'clock positions on the tray sensor.

9. The security device of claim 1, wherein the display stand comprises a charge head configured to removably support the tray sensor thereon.

10. The security device of claim 9, wherein the charge head comprises a plurality of electrical contacts for electrically connecting to each set of the plurality of contacts of the tray sensor at any one of the plurality of different locations when the tray sensor is supported on the charge head.

11. The security device of claim 9, wherein the charge head is removably attached to the display stand.

12. The security device of claim 9, further comprising a plurality of charge heads configured to be interchangeably and electrically connected to the display stand.

13. The security device of claim 1, wherein each contact of each set of the plurality of contacts extends in each of an X direction, a Y direction, and a Z direction, and wherein the adaptor is configured to engage each set of the plurality of contacts at different X, Y, and Z locations at each of the plurality of locations.

14. The security device of claim 1, wherein each contact of each set of the plurality of contacts has a greater length than the adapter to allow for engagement at different X and Y locations along each contact of each set of the plurality of contacts.

15. The security device of claim 1, wherein each contact of each set of the plurality of contacts has a greater height than the adapter to allow for engagement at different Z locations along each contact of each set of the plurality of contacts.

16. A merchandise display security device for displaying and protecting a wearable device from theft, the wearable device comprising a body and a band secured thereto, the security device comprising:

a sensor configured to be coupled to the wearable device, wherein the sensor comprises a tray sensor configured to electrically connect to the body;

a display stand configured to removably support the sensor thereon; a cable electrically connected to the sensor;

an alarm module electrically connected to the cable and the sensor; and an adapter configured to removably engage the body of the wearable device, wherein the tray sensor comprises a set of plurality of contacts located at each of a plurality of different locations configured to electrically connect to the adapter when the body is attached to the tray sensor, wherein the adapter is configured to electrically connect to each set of the plurality of contacts at each of the plurality of locations at different X, Y locations or at a different Z location, wherein a sense loop is configured to be defined through the cable and the tray sensor, and wherein the alarm module is configured to generate a security signal in response to interruption of the sense loop.

17. The security device of claim 16, wherein each contact of each set of the plurality of contacts extends in each of an X direction, a Y direction, and a Z direction, and wherein the adaptor is configured to engage each set of the plurality of contacts at different X, Y, and Z locations at each of the plurality of locations.

* * * * *